United States Patent Office 2,712,721
Patented July 12, 1955

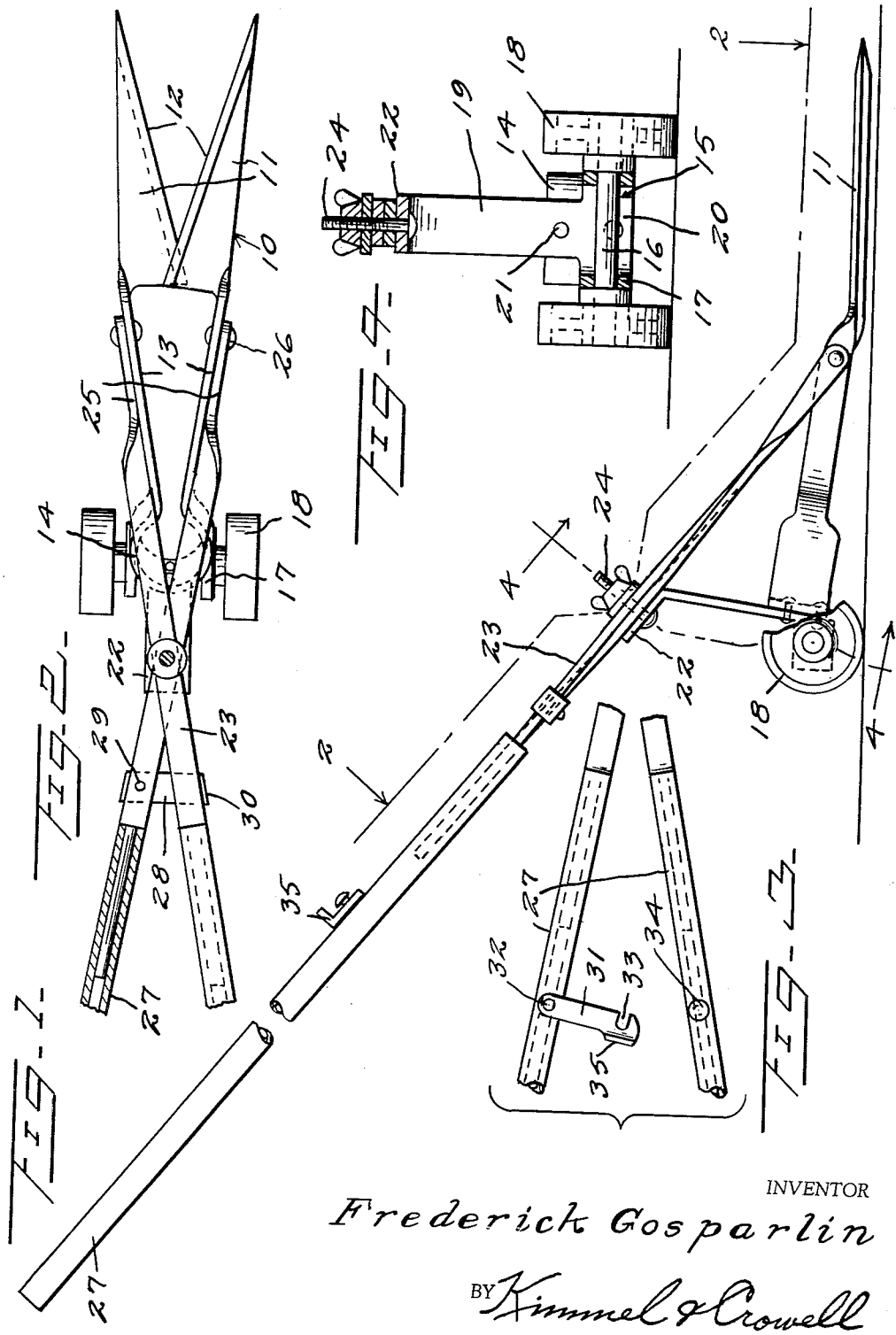

2,712,721

WHEEL MOUNTED GRASS TRIMMING SHEARS

Frederick Gosparlin, Glendale, Calif.

Application July 26, 1954, Serial No. 445,521

1 Claim. (Cl. 56—241)

This invention relates to a grass trimmer.

An object of this invention is to provide in combination a shears of the type known as sheep shears, a pair of elongated handles secured to the shears, and means mounting a pair of wheels on the shears.

Another object of this invention is to provide a grass trimmer embodying a pair of spring-pressed blades normally urged outwardly, a wheel mounting, and a pair of handles pivotally carried by the mounting and secured to the shanks of the blades.

A further object of this invention is to provide a means whereby the shears of the sheet type may be converted into a grass trimming shears.

With the above and other objects in view, my invention consists in the arrangement, combination and details of construction disclosed in the drawing and specification, and then more particularly pointed out in the appended claim.

In the drawing:

Figure 1 is a detail side elevation, partly broken away, of a grass trimmer constructed according to an embodiment of this invention.

Figure 2 is a fragmentary sectional view taken on the line 2—2 of Figure 1.

Figure 3 is a fragmentary plan view showing the handles in released position.

Figure 4 is an enlarged sectional view taken on the line 4—4 of Figure 1.

Referring to the drawing, the numeral 10 designates generally a shears embodying a pair of triangular blades 11 having peened edges 12. The blades 11 have extending rearwardly therefrom shanks 13 which are formed integral with a partly circular spring 14. The spring 14 is adapted to normally urge the blades 11 outwardly to an open position which is the position shown in Figure 2.

The shears herein disclosed are of the type known as sheep shears, and in order to provide a means whereby these shears may be used as grass trimmers, I have provided a U-shaped member 15 which has a shaft 16 extending through the rearwardly projecting parallel sides 17 thereof, and traction wheels 18 are mounted on the shaft 16.

An upwardly projecting bar 19 extends from the bight 20 of the U-shaped member 15, and fastening members 21 extend through the bight 20 and the lower portion of bar 19 for securing the wheel mounting on the rear of the spring 14.

The bar 19 at its upper end is formed with an obtusely inclined extension 22 which forms a bearing for a pair of crossed bars 23. The bars 23 are pivotally mounted on a pivot bolt 24 which extends through the bearing mounting 22.

The lower ends of the bars 23 are twisted as indicated at 25, and the ends 25 are secured by fastening means 26 to the shanks 13. The bars 23 at their rear upper ends have mounted thereon elongated handles 27.

A U-shaped stop member 28 is secured by fastening means 29 to one of the bars 23 and extends beneath the two bars 23. The stop member 28 includes an upwardly projecting flange 30 engageable with the opposite bar 23 so as to limit the outward swinging of the bars 23 and the movement of the blades 11 to open position.

A pivoted locking member 31 is pivoted as at 32 on one of the handles 27 and is formed with a keeper notch 33 within which a headed locking bolt 34 carried by the opposite handle 27 is adapted to engage.

A right angle finger piece 35 extends from the locking member 31 so that this locking member can be readily moved to locking or released position.

In the use and operation of this shears, the handles 27, which may be of any desired length, are grasped in the handles of the operator and the blades 11 are disposed in substantially a horizontal position as shown in Figure 1. The shears by means of the wheels or rollers 18 is then moved forwardly over the ground and the handles 27 are then rocked back and forth on pivot 24.

What is claimed is:

A grass trimming shears comprising a pair of blades, rearwardly convergent arms extending from said blades, an arcuate spring integral with the rear ends of said arms, a pair of elongated crossed handles, means securing the forward ends of said handles to said arms, a pivot bolt extending through the crossing point of said handles, a U-shaped member having its bight directly fixed to the rear of said spring with the legs of said U-shaped member extending oppositely of said blades, a pair of traction wheels rotatably carried by said U-shaped member, an upstanding bracket integrally carried by said U-shaped member, said bracket terminating in an obtusely disposed upper end, said pivot bolt engaging through said upper end of said bracket, and means carried by one handle engageable with the other handle for limiting the outward swinging of said handles.

References Cited in the file of this patent

UNITED STATES PATENTS

| | | |
|---|---|---|
| 708,737 | Rhodes | Sept. 9, 1902 |
| 810,344 | Pierce et al. | Jan. 16, 1906 |
| 1,410,247 | Griffin | Mar. 21, 1922 |